United States Patent [19]

Tsukai

[11] Patent Number: 4,633,454
[45] Date of Patent: Dec. 30, 1986

[54] OPTICAL INFORMATION PICKUP APPARATUS

[75] Inventor: Yoshiyuki Tsukai, Saitama, Japan

[73] Assignee: Pioneer Electronic Corporation, Tokyo, Japan

[21] Appl. No.: 580,308

[22] Filed: Feb. 15, 1984

[30] Foreign Application Priority Data

Feb. 15, 1983 [JP] Japan ............... 58-21331[U]

[51] Int. Cl.⁴ ................................. G11B 7/00
[52] U.S. Cl. ...................... 369/45; 250/201; 369/46
[58] Field of Search .................. 369/43–46; 358/342; 250/201 DF

[56] References Cited

U.S. PATENT DOCUMENTS

| 4,357,533 | 11/1982 | Winslow | 369/45 X |
| 4,414,658 | 11/1983 | Yoshida | 369/46 |
| 4,445,209 | 4/1984 | Mickleson et al. | 369/45 |

FOREIGN PATENT DOCUMENTS 125547 9/1980 Japan ................................. 369/45

Primary Examiner—Robert L. Richardson
Attorney, Agent, or Firm—Sughrue, Mion, Zinn, Macpeak and Seas

[57] ABSTRACT

An optical information pickup apparatus for use in an optical disc reader in which a regenerated information signal, a focus servo signal and a tracking servo signal are produced with a single illuminating beam and a single optical system. The light sensing element is divided into four light sensing surfaces. An inner pair of the light sensing surfaces are symmetrically disposed along a line forming a 45° angle with a line on the surface of the detector corresponding to the tracking direction on the recorded disc. The third and fourth light sensing surfaces surround the first and second light sensing surfaces and are divided along the line corresponding to the tracking direction. Signals are combined from the light sensing surfaces to produce the regenerated information signal, the focus servo signal and the tracking servo signal.

5 Claims, 10 Drawing Figures

OPTICAL INFORMATION PICKUP APPARATUS

BACKGROUND OF THE INVENTION

The present invention relates to an optical information pickup apparatus.

In an optical video disc player, or compact audio disc player or the like a track composed of pits on a recording surface of the disc is illuminated with a light spot, and changes in the reflected light from the track are converted to an electrical signal from which various information such as image information can be obtained.

In such an optical information pickup apparatus, a so-called focus servo signal and tracking servo signal as well as a regenerative (recorded information bearing) signal are simultaneously detected using a photoelectric element. Ths focus servo signal is used for accurately converging the illuminating beam onto the recording surface of the disc, whereas the tracking servo signal is used for maintaining the alignment of the illuminating beam with the track.

Currently available systems for detecting the focus servo signal employed in conventional apparatuses include an astigmatism system, a wedge-prism application system, an critical-angle prism application system, and a double-circle system. The astigmatism system, the wedge-prism system and the critical-angle prism systems are disadvantageous with regard to cost since optical parts such as a cylindrical lens or a prism and the like are used. The double-circle system involves a difficulty in achieving precise servo control since the light of the regenerative signal tends to interfere with that of the focus servo signal as the illuminating beam traverses the recording track of the disc. Moreover, the conventional optical information pickup apparatus requires other optical parts, such as an optical grating and the like, which are costly.

It is therefore an object of the invention to provide an optical information pickup apparatus which is capable of detecting the servo signal with considerable accuracy and which is of low cost.

SUMMARY OF THE INVENTION

In accordance with the above and other objects of the invention, there is provided an optical information pickup apparatus including means for illuminating a recording medium with a single light beam, a light sensing element, and means for directing reflected light from the surface of the recorded medium to the light sensing element. In accordance with the invention, the light sensing element is composed of four light sensing surfaces, each of which produces an output electrical signal having a magnitude determined in accordance with the magnitude of light falling thereon. First and second ones of the light sensing surfaces are symmetrically disposed around a line forming a 45° angle with a line on the light sensing element corresponding to a tracking direction on the recorded medium. The third and fourth light sensing areas surround the first and second light sensing surfaces. Preferably, the first and second light sensing surfaces are round in shape.

DESCRIPTION OF THE PREFERRED EMBODIMENTS

Figure 1:
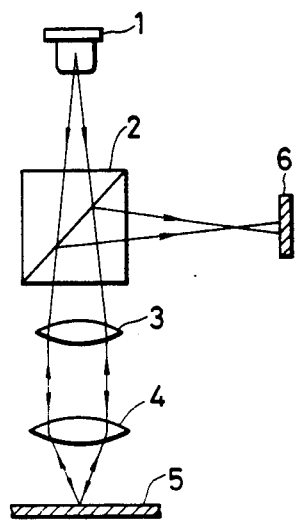
FIG. 1 is a schematic view of an optical information pickup apparatus constructed in accordance with the present invention.

Referring now to FIG. 1, a preferred embodiment of an optical information pickup apparatus constructed in accordance with the teachings of the present invention will now be described.

In the apparatus of FIG. 1, light from a light source 1, which may be a semiconductor laser or the like, passes through a beam splitter 2 and a collimating lens 3, and then is converged by an objective lens 4 onto the surface of a recorded disc 5. The light reflected from the surface of the disc 5 passes back through the objective lens 4 and the collimating lens 3, and then is directed by the beam splitter 2 onto the surface of a light sensing element 6.

Figure 2:
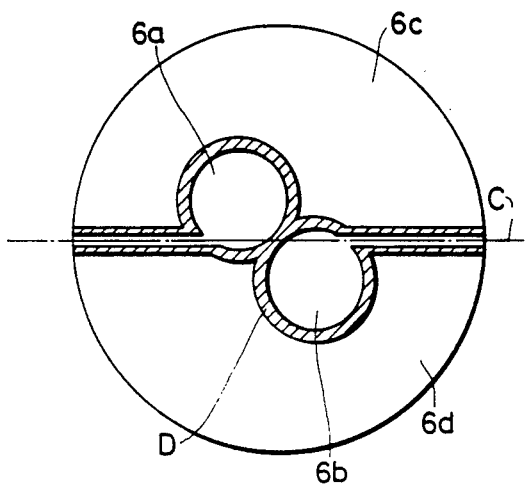
FIG. 2 is a top view of a light sensing element employed in the optical information pickup apparatus of FIG. 1.

The surface structure of the light sensing element 6 is depicted in FIG. 2. As shown therein, the light sensing element 6 is formed by a pair of inner light sensing surfaces 6a and 6b, each having a circular shape. The surfaces 6a and 6b are symmetrical about a line forming an angle of 45° with a line C corresponding to the tracking direction on the disc 5. For reasons to be explained below, the diameters of the surfaces 6a and 6b are preferably substantially one-half the diameter of the return beam when it is properly focused on the light sensing element 6. The outer light sensing surfaces 6c and 6d encircle the inner light sensing surfaces 6a and 6b. The hatched regions D in FIG. 2 are nonsensitive areas between light sensing surfaces. The surfaces 6a through 6d produces respective output signals $I_1$ through $I_4$, which have magnitudes determined in accordance with the intensity of the light striking the surfaces 6a through 6d.

In accordance with the invention, a focus servo signal $I_F$ can be expressed by: $I_F = I_1 + I_2 - I_3 - I_4$, while the regenerated information signal $I_{RF}$ may be expressed by: $I_{RF} = I_1 + I_2 + I_3 + I_4$. The tracking servo signal $I_T$ can be expressed by the same formula as that of $I_F$.

The operation of the apparatus shown in FIGS. 1 and 2 will now be explained with reference to FIGS. 3A through 3C and 4A through 4C.

Figure 3A:
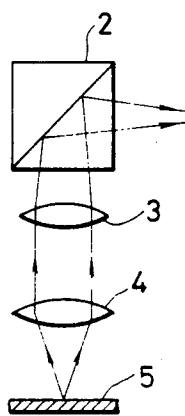
FIGS. 3A through 3C are explanatory views used to explain the manner in which a focus servo signal is detected.
Figure 4A:
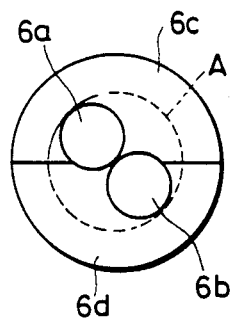
FIGS. 4A through 4C are top views of the light sensing element of FIG. 2, corresponding to FIGS. 3A through 3C, respectively.

When the return beam incident upon the light sensing element 6 is in proper focus, as illustrated by FIGS. 3A and 4A, the diameter of the return beam on the surface of the light sensing element 6 will be twice the diameter of either of the surfaces 6a and 6b. That is, the return beam forms a spot A which forms a great circle around the surfaces 6a and 6b. From simple geometric considerations, it can be seen that the sum of the areas of the outer pair 6c and 6d of the light sensing surfaces without the spot A is equal to the area of the surfaces 6a and 6b.

Figure 3B:
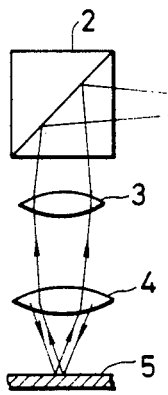
Figure 3C:
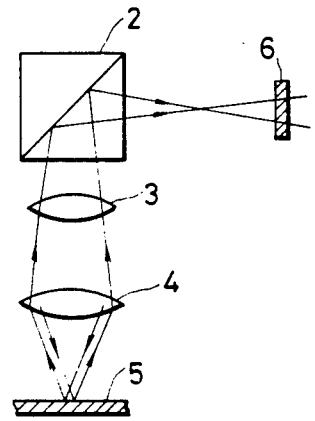
Figure 4B:
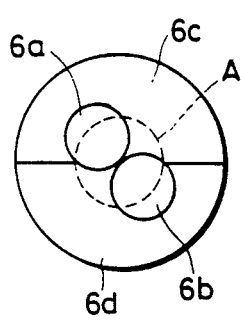
Figure 4C:
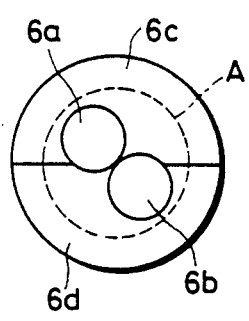

Accordingly, assuming that the sensitive surfaces 6a through 6d have the same sensitivities, $I_F=0$. On the other hand, as illustrated in FIGS. 3B and 4B, if the returned light beam is focused at a point behind the surface of the light sensing element 6, the sum of the areas of the surfaces 6a and 6b illuminated by the spot A is greater than the total surface area of the surfaces 6c and 6d illuminated by the spot A. Accordingly, the signal $I_F$ will have a positive value. If the return beam is focused in front of the surface of the light sensing element 6, as illustrated by FIGS. 3C and 4C, the illuminated area of the outer pair of surfaces 6c and 6d will be greater than that of the surfaces 6a and 6b, and hence $I_F$ will then have a negative value.

Figure 5:
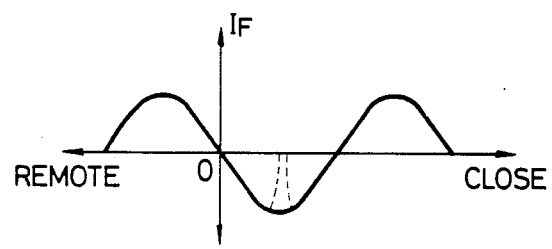
FIG. 5 is a graph showing changes of the focus servo signal in response to changes in the relative position of an objective lens and the recorded disc in the apparatus of FIG. 1.

The value of $I_F$ plotted against the focussed position is indicated in the graph of FIG. 5. The dashed lines in FIG. 5 indicate the nonsensitive hatched portions D indicated in FIG. 2.

Figure 6:
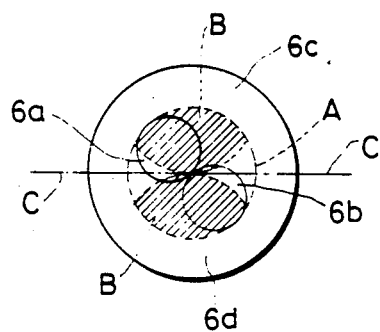
FIG. 6 shows a top view of the light sensing element and is used in an explanation of the manner in which a tracking servo signal is detected.

With regard to the tracking servo signal $I_T$, the case where tracking is proper is illustrated by FIG. 6. Specifically, the hatched areas B in FIG. 6 correspond to the plus and minus first degree diffracted light returned from the recorded medium 5. For the case of proper tracking illustrated in FIG. 6, the illuminated areas of the surfaces 6a through 6d are all equal to one another, and hence $I_T=0$. On the other hand, when the illuminating spot on the surface of the recorded medium 5 is out of track, the illuminated areas of the surfaces 6a through 6d due to the first degree diffracted light are different from one another, and hence $I_T \neq 0$.

With the optical information pickup apparatus of the invention, because the areas 6a and 6b are formed symmetrically along a line which forms a 45° angle with the line C corresponding to the tracking direction, when the illuminating beam is crossing tracks, influence on the focus servo signal is avoided because the focus servo signal includes terms of $I_1-I_3$ and $I_2-I_4$.

As described above, in the optical information pickup apparatus of the invention, no separate optical components are required for focus servo signal generation or tracking servo signal generation. That is, the regenerated information signal, the focus servo signal and the tracking servo signal are produced using only a single beam. Furthermore, the focus servo signal is substantially unaffected by deflected light produced when the illuminating beam is crossing recording tracks so that the servo signals are produced with a high accuracy.

It is noted that the invention is not limited to the particular embodiment described above. Specifically, it is not necessary that the light sensitive surfaces of the light sensing element 6 be divided into four parts. For instance, three surfaces may be used whereby the surfaces 6c and 6d are combined into a single light sensing surface. Additionally, the configuration of the light sensing surfaces 6a and 6b is not limited to a circular shape, and the surfaces 6a and 6b may be elliptical, square or another desired geometric configuration so long as the surfaces 6a and 6b provide $I_F=0$ with the return beam being equally divided between the surfaces 6a and 6b when the return beam is properly focused on the surface of the light sensing element 6.

This completes the description of the preferred embodiments of the invention. Although preferred embodiments have been described, it is believed that numerous modifications and alterations thereto would be apparent to one of ordinary skill in the art without departing from the spirit and scope of the invention.

What is claimed is:

1. An optical information pickup apparatus for detecting information recorded on a recording medium in a form of tracks and for producing a focus servo signal and a tracking servo signal, comprising: means for producing a single light beam; means for directing said light beam onto said recorded medium; and a light sensing element, said light sensing element comprising first and second light sensing surfaces which are positioned symmetrically about a line which intersects at 45° a line on said light sensing element corresponding to a tracking direction on said recorded medium and at least a third light sensing surface surrounding said first and second light sensing surfaces, said light sensing element being disposed in a path of a return beam reflected from said recorded medium.

2. The optical information pickup apparatus of claim 1, wherein said at least a third surface comprises a third light sensing surface and a fourth light sensing surface, said third and fourth light sensing surfaces being divided along said line corresponding to said tracking direction on said light sensing element.

3. The optical information pickup apparatus of claim 1, wherein said first and second light sensing surfaces are circularly shaped and are of equal surface areas.

4. The optical information pickup apparatus of claim 1, wherein said means for directing said light beam onto said recorded medium comprises a beam splitter, a collimating lens and an objective lens, said light sensing element being disposed in a return path provided by said beam splitter.

5. The optical information pickup apparatus of claim 3, wherein diameters of said first and second light sensing surfaces are each substantially one-half a diameter of a return light beam when properly focused on said light sensing element.

* * * * *